United States Patent [19]

Nagata

[11] Patent Number: 5,374,386
[45] Date of Patent: Dec. 20, 1994

[54] METHOD FOR PRODUCING WEATHER STRIP

[75] Inventor: Tatsuhiko Nagata, Inazawa, Japan

[73] Assignee: Toyoda Gosei Co., Ltd., Nishikasugai, Japan

[21] Appl. No.: 181,162

[22] Filed: Jan. 13, 1994

Related U.S. Application Data

[63] Continuation of Ser. No. 949,262, Sep. 24, 1992, abandoned.

[30] Foreign Application Priority Data

Sep. 25, 1991 [JP] Japan .................. 3-273087
Jan. 21, 1992 [JP] Japan .................. 4-030207

[51] Int. Cl.$^5$ .............. B29B 11/02; B29C 45/14; B29C 47/04
[52] U.S. Cl. .................. 264/145; 264/177.1; 264/259; 264/318
[58] Field of Search ......... 264/171, 171.17, 177.1, 264/177.2, 138, 145, 259, 513, 516, 328.1, 318; 49/490, 491, 497, 498, 441, 479

[56] References Cited

U.S. PATENT DOCUMENTS

| | | | |
|---|---|---|---|
| 3,958,369 | 5/1976 | Mathellier | 49/479 |
| 4,183,778 | 1/1980 | Mesnel | 156/245 |
| 4,374,880 | 2/1983 | Mesnel | 49/491 |
| 4,411,941 | 10/1983 | Azzola | 49/498 |
| 4,513,044 | 4/1985 | Shigeki et al. | 49/490 |
| 4,722,815 | 2/1988 | Zoller | 264/177.2 |
| 4,769,947 | 9/1988 | Ogawa et al. | 49/479 |
| 4,854,079 | 8/1989 | Karibe et al. | 49/479 |
| 4,884,370 | 12/1989 | Nozaki et al. | 49/479 |
| 4,964,620 | 10/1990 | Omura et al. | 264/261 |
| 4,976,069 | 12/1990 | Arima et al. | 49/479 |
| 5,038,522 | 8/1991 | Nozaki | 49/497 |
| 5,143,772 | 9/1992 | Iwasa | 264/45.9 |

FOREIGN PATENT DOCUMENTS 1-293248  11/1989  Japan ............... 49/490

Primary Examiner—Jay H. Woo
Assistant Examiner—Duane S. Smith
Attorney, Agent, or Firm—Cushman, Darby & Cushman

[57] ABSTRACT

A method for producing a weather strip of which an external surface is covered with a finishing covering layer such as a fabric layer, the weather strip having a sealing portion which is partially formed by using a mold without the damage of the covering layer due to the heat of the mold. The method includes extruding a weather strip having a trim portion, a sealing portion projecting from one side wall of the trim portion, and a lip extending along a border between the trim portion and the sealing portion, covering an external surface of the trim portion of the continuously extruded weather strip with a covering layer continuously, cutting the sealing portion away from one part of the extruded weather strip, placing the one part of the extruded weather strip within a mold so that the lip is interposed between a heated mold member of the mold and one widthwise end edge of the covering layer in pressing contact therewith, and injecting a molding material into the mold to form a molded sealing portion in the one part of the weather strip from which the extruded sealing portion is cut away.

5 Claims, 6 Drawing Sheets

METHOD FOR PRODUCING WEATHER STRIP

This is a continuation of application Ser. No. 07/949,262, filed Sep. 24, 1992, which was abandoned upon the filing hereof.

BACKGROUND OF THE INVENTION

1. Field of the Invention

The present invention relates to a method for producing a weather strip for a motor vehicle or the like.

2. Description of the Art

Weather strips to be attached along openings of motor vehicles generally have a trim portion and a hollow sealing portion, respectively. In order to improve the appearance of the external surface of the trim portion, it has been covered with a finishing covering layer, such as a fabric layer, resin coating and a flocking layer. Such weather strips have molded sealing portions at some parts, such as a corner part thereof.

FIGS. 7 and 7A illustrate an example of the above-described weather strips. A weather strip 10 has a trim portion 11 of solid rubber, and a sealing portion 14 of sponge rubber. This weather strip 10 is integrally formed by extrusion. In the corner part of the weather strip 10 which is to be attached along the corner of a door opening of a motor vehicle, a molded sealing portion 16 is formed by cutting the extruded sealing portion 14 away from the extruded weather strip 10, bending the trim portion 11 in conformity to the corner of the door opening, and molding the sealing portion 16 onto the bent trim portion 11. The width of the molded sealing portion 16 gradually increases towards the center of the corner thereof so that the molded sealing portion 16 takes a substantially L-shaped configuration.

A fabric layer 18 is bonded to the external surface of the trim portion 11 of the weather strip 10 in order to improve the appearance thereof.

As shown in FIG. 8, the above-described molded sealing portion 16 is formed by placing the corner part of the extruded weather strip 10 from which the sealing portion 14 is cut away within a mold 20, and injecting a sponge rubber material into a cavity 26. The mold 20 includes a lower mold member 24, an upper mold member 21, a heating middle mold member 22, a core member 25 and a trim-supporting mold member 23. The upper mold member 21, middle mold member 22 and core member 25 define the cavity 26.

In this case, if the fabric layer 18 is previously bonded to the trim portion 11, as shown in FIG. 8, the middle mold member 22, which is heated at about 180° C. in order to cure the injected sponge rubber material, comes into pressing contact with the end edge of the fabric layer 18, whereby the fabric layer 18 melts or deteriorates. In order to prevent this problem, conventionally, the fabric layer 18 has been bonded to the trim portion 11 after the sealing portion 16 is molded. This conventional method, however, requires an increased number of production steps and additional equipment as compared to the method wherein the fabric layer 18 is bonded to the trim portion 11 continuously in the process of extruding the weather strip 10. Therefore, with the above-described conventional method, the work efficiency is undesirably reduced.

SUMMARY OF THE INVENTION

It is an object of the present invention to provide a method for producing a weather strip, by which a molded sealing portion can be formed onto the weather strip covered with a finishing covering layer, such as a fabric layer, without deterioration or melting of the covering layer.

The method in accordance with the present invention includes the steps of extruding a weather strip having a trim portion and a sealing portion, covering an external surface of the trim portion of the extruded weather strip with a finishing covering layer so that one widthwise end edge of the covering layer extends along a border between the external surface of the trim portion and the sealing portion continuously in the process of the extruding step, cutting the sealing portion away from one part of the extruded weather strip, placing the one part of the extruded weather strip within a mold so that a projecting portion formed along the border is interposed between the one widthwise end edge of the covering layer and a heated mold member of the mold in pressing contact therewith, and injecting a molding material into a cavity of the mold to form a molded sealing portion onto the one part of the extruded weather strip.

The above-described projecting portion is composed of a lip which serially projects from a root portion of the sealing portion, or the trim portion along the border between the external surface of the trim portion and the sealing portion. This lip is formed by extrusion with the weather strip.

Instead, the above-described projecting portion may be formed by bending a root portion of the cut away sealing portion along the border between the external surface of the trim portion and the sealing portion so as to cover the one widthwise end edge of the covering layer when the one part of the weather strip is placed within the mold.

In accordance with the present invention, in the molding step, a lip-shaped projecting portion or bent root portion of the cut away sealing portion is interposed between the covering layer and the heated mold member, thereby preventing heat from being transmitted to the covering layer, and accordingly preventing the covering layer from deteriorating or melting.

Other objects, features and characteristics of the present invention will become apparent upon consideration of the following description and the appended claims with reference to the accompanying drawings, all of which form a part of the specification.

DETAILED DESCRIPTION OF THE PRESENTLY PREFERRED EXEMPLARY EMBODIMENTS

Figure 1:
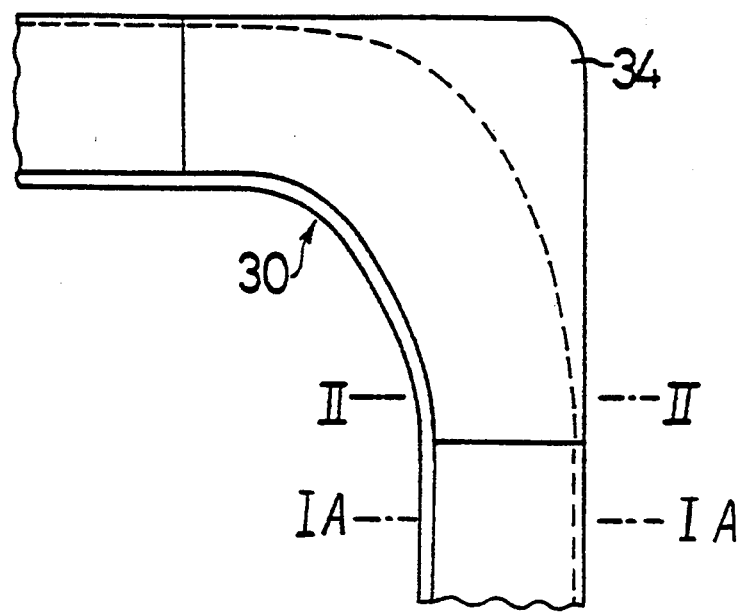
FIG. 1 is a view illustrating a corner part of a weather strip which is produced by a first embodiment of a method in accordance with the present invention.
Figure 2:
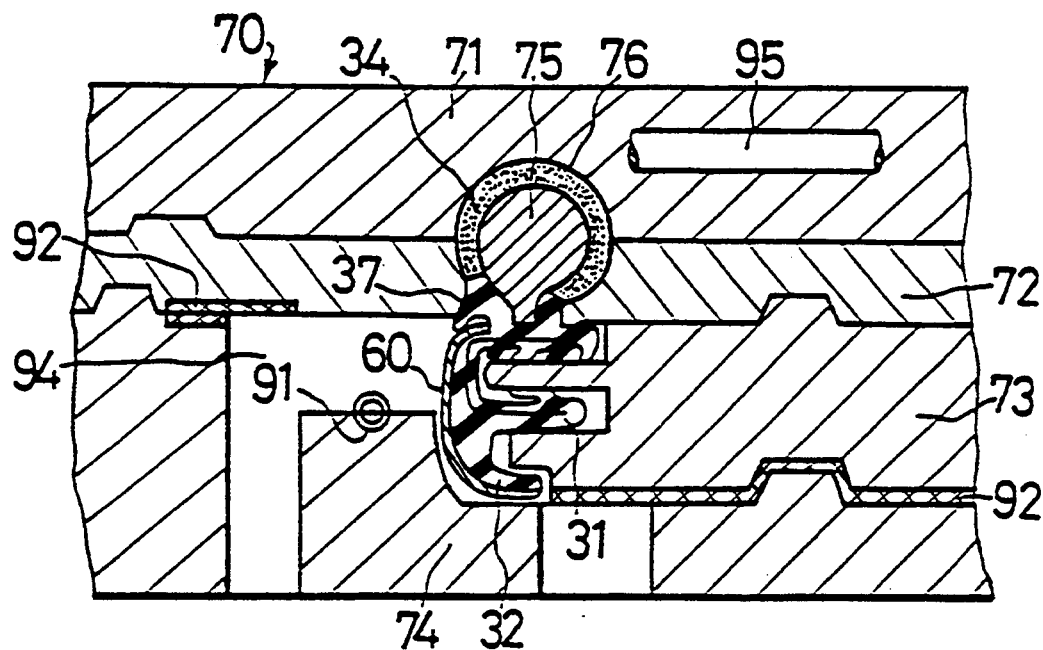
FIG. 2 is a cross-sectional view of the weather strip taken along the line II—II of FIG. 1, of which the sealing portion is formed by molding.

FIG. 1 illustrates a corner part of the weather strip which is produced by the method of the first embodiment of the present invention, and FIG. 2 illustrates a cross-section of the weather strip taken along the line II—II of FIG. 1, of which the sealing portion is formed by molding.

Figure 1A:
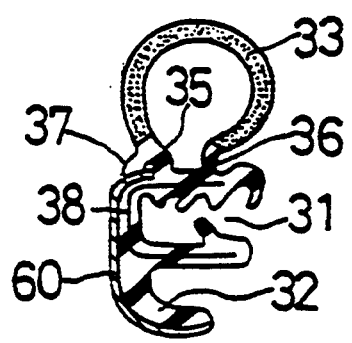
FIG. 1A is a cross-sectional view taken along the line 1A—1A of FIG. 1.

A weather strip 30, which is to be attached along a door opening of a motor vehicle, has a trim portion 31 (FIG. 1A) of a substantially U-shaped cross-section, a garnish portion 32 extending from the bottom of the trim portion 31 and a hollow sealing portion 33 projecting from one of the side walls of the trim portion 31. This weather strip 30 is formed by extrusion.

The trim portion 31, the garnish portion 32 and the root portions 35, 36 of the hollow sealing portion 33, which are connected to the trim portion 31, are made of solid rubber whereas the hollow sealing portion 33 except for the root portions 35, 36 is made of sponge rubber. A metal core 38 is embedded in the trim portion 31. A fabric layer 60 is bonded to the trim portion 31 and the garnish portion 32 so as to cover the external surface thereof.

In the corner part of the weather strip 30, the extruded sealing portion 33 is cut away, and a molded sealing portion 34 is formed in the cut away corner part of the weather strip 30.

The weather strip 30 having the above-described construction is produced by the following method: Namely, the weather strip 30 having the trim portion 31, the garnish portion 32, and the sealing portion 33 is extruded so that a lip 37 projects from the outside surface of the root portion 35 of the sealing portion 33 towards the corner of the bottom of the trim portion 31. The fabric layer 60 is bonded to the external surface of the trim portion 31 and garnish portion 32 continuously in the process of extruding the weather strip 30.

Then, the sealing portion 33 of one longitudinal part of the extruded weather strip 30 to which the fabric layer 60 has been bonded, is cut away except for its root portion 35, 36.

The trim portion 31 of the one longitudinal part of the weather strip from which the sealing portion 33 is cut away is bent along the corner of the door opening, and is placed within a mold 70.

As shown in FIG. 2, the mold 70 has an upper mold member 71, a middle mold member 72, a trim-supporting mold member 73, a lower mold member 74 and a core member 75. The upper mold member 71, the middle mold member 72 and the core member 75 define a cavity 76. A heater 95 is disposed within the upper mold member 71 to heat the mold members 71, 72, 75 which define the cavity 76. A water channel 91 in which cooling water flows is disposed in the lower mold member 74. Heat insulating layers 92 are disposed within the mold member 73, and between the contacting surfaces of the mold members 72 and 74 as shown.

When the bent part of the weather strip 30 is placed within the mold 70, lip 37 is interposed between the widthwise end edge of the fabric layer 60 bonded to the trim portion 31 and the heated middle mold member 72 in pressing contact therewith. By virtue of the lip 37, the fabric layer 60 is prevented from directly contacting the heated middle mold member 72.

After the mold 70 is closed, a sponge rubber material is injected into the cavity 76 from a runner (not shown) through a gate (not shown), whereby a molded sealing portion 34 is formed in the bent part of the weather strip 30.

With the present embodiment, by virtue of the lip 37, the fabric layer 60 is thermally insulated from the heated mold member 72 so as to be prevented from deforming, deteriorating or melting due to heat of the heated mold member 72.

Within the mold 70, the fabric layer 60 directly contacts the lower mold member 74, but the fabric layer 60 is not affected by the lower mold member 74 because it is spaced apart from the heated middle mold member 72 by a spacing 94, and the water channel 91 is disposed in the lower mold member 74.

Figure 3:
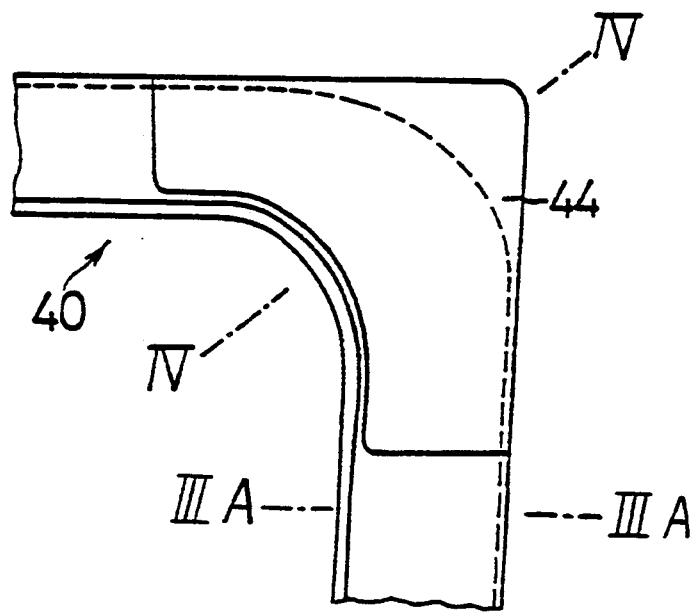
FIG. 3 is a view illustrating a corner part of a weather strip which is produced by a second embodiment of a method in accordance with the present invention.
Figure 4:
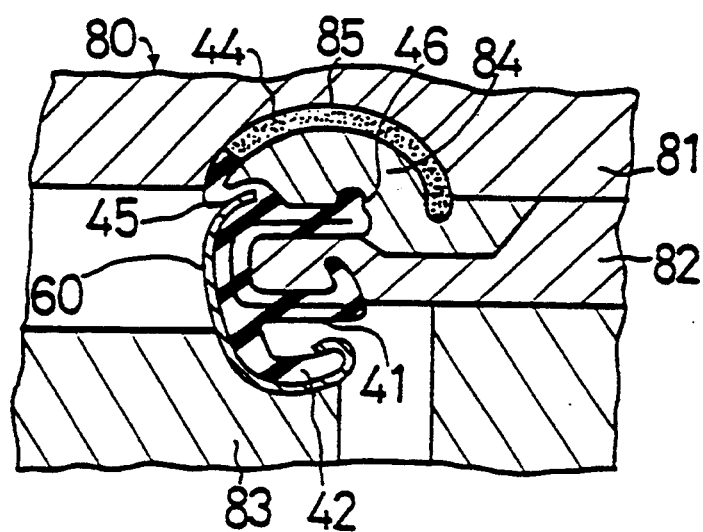
FIG. 4 is a cross-sectional view of the weather strip taken along the line IV—IV of FIG. 3, of which the sealing portion is formed by molding.

FIG. 3 illustrates a corner part of the weather strip which is produced by the method of the second embodiment of the present invention, and FIG. 4 illustrates a cross-section of the weather strip taken along the line IV—IV of FIG. 3, of which the sealing portion is formed by molding.

Figure 3A:
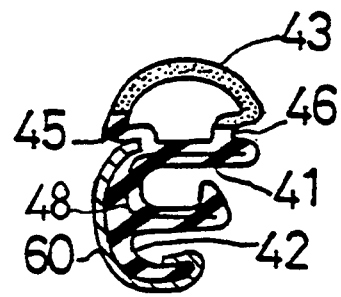
FIG. 3A is a cross-sectional view taken along the line 3A—3A of FIG. 3.

In FIGS. 3 and 3A, a weather strip 40 has a trim portion 41 in which a metal core 48 is embedded, a hollow sealing portion 43 projecting from one of the side walls of the trim portion 41, and a garnish portion 42 extending from the bottom of the trim portion 41. This weather strip 40 is formed by extrusion. The trim portion 41, the garnish portion 42 and root portions 45, 46 of the sealing portion 43, which are connected to the trim portion 41, are made of solid rubber, whereas the sealing portion 43 except for the root portions 45, 46 is made of sponge rubber. The root portion 45 is formed longer than the root portion 46, and has such a configuration as to protrude outwardly. The fabric layer 60 is bonded to the external surface of the trim portion 41 and garnish portion 42 continuously in the process of extruding the weather strip 40.

The sealing portion 43 of one longitudinal part of the extruded weather strip 40 to which the fabric layer 60 has been bonded, is cut away except for the root portions 45 and 46.

Then, the trim portion 41 of the one longitudinal part of the extruded weather strip 40 from which the sealing portion 43 has been cut away is bent in conformity to the corner of the door opening, and placed within a mold 80.

As shown in FIG. 4, the mold 80 includes an upper mold member 81, a trim-supporting mold member 82, a lower mold member 83, and a core member 84. The upper mold member 81 and the core member 84 define a cavity 85 for forming a molded sealing portion 44. The cavity 85 has a cross-section like an arch-shaped lip, and an end of the cavity 85 is located apart from the base portion 46.

The upper mold member 81, and the core member 84 have such configurations as to bend the root portion 45 towards outwardly and bring the bent root portion 45 into pressing contact with the widthwise end edge of the fabric layer 60 so as to cover it.

After the bent part of the weather strip 40 is placed within the mold 80, the mold 80 is closed. Next, a sponge rubber material is injected into the cavity 85 to form the molded sealing portion 44 onto the bent part of the weather strip 40.

With the second embodiment, the root portion 45 thermally insulates the fabric layer 60 from the heated upper mold member 81 so that the fabric layer 60 is prevented from deteriorating and melting.

Figure 5:
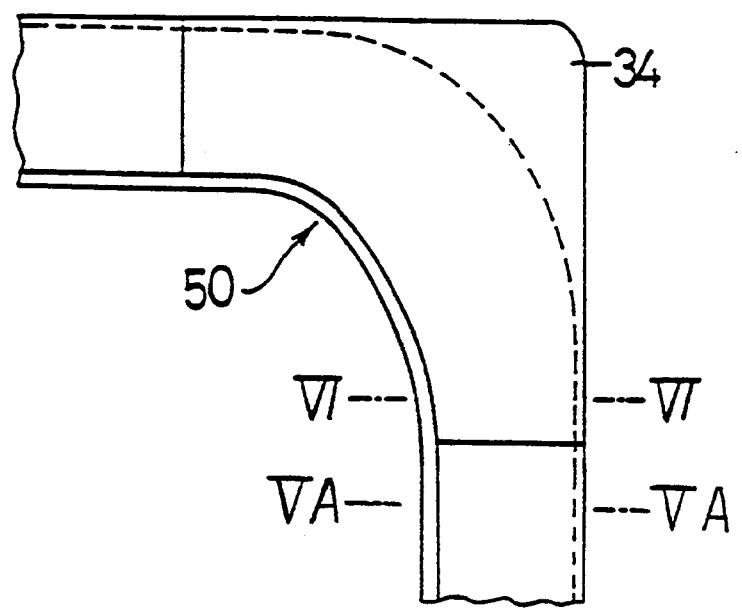
FIG. 5 is a view illustrating a corner part of a weather strip which is produced by a third embodiment of a method in accordance with the present invention.
Figure 6:
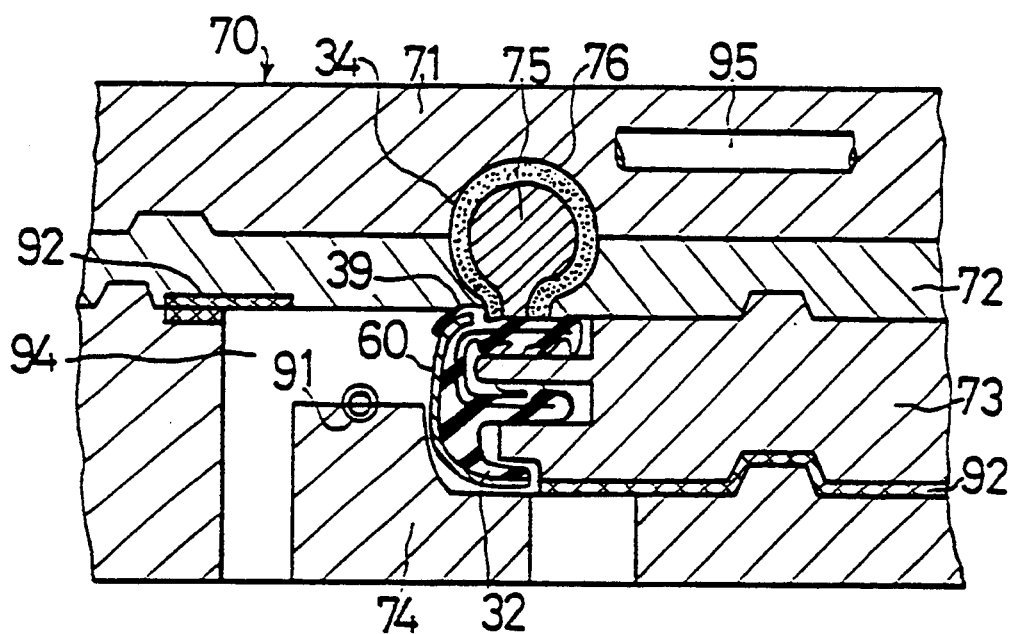
FIG. 6 is a cross-sectional view of the weather strip taken along the line VI—VI of FIG. 5, of which the sealing portion is formed by molding.
Figure 7:
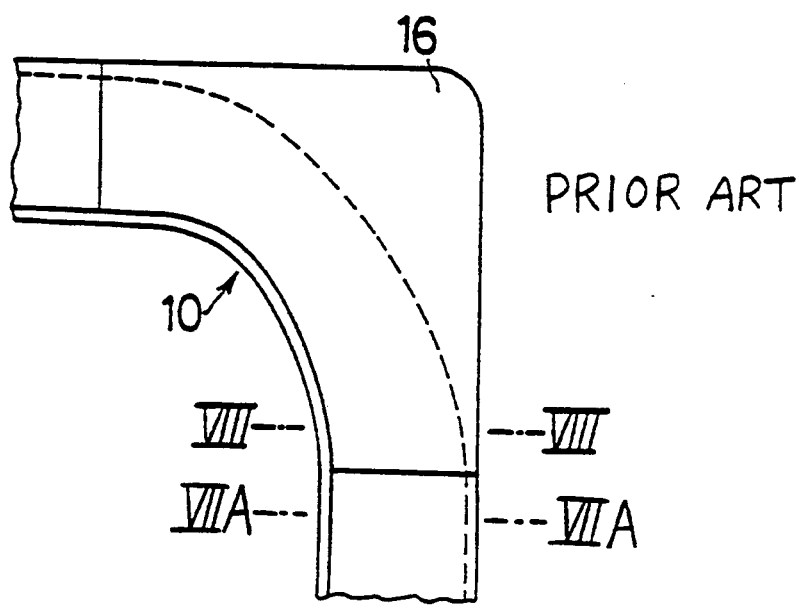
FIG. 7 is a view illustrating a corner part of a conventional weather strip.
Figure 7A:
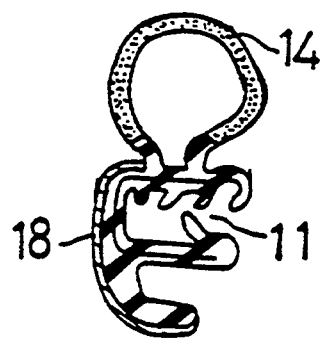
FIG. 7A is a cross-sectional view taken along line 7A—7A of FIG. 7.
Figure 8:
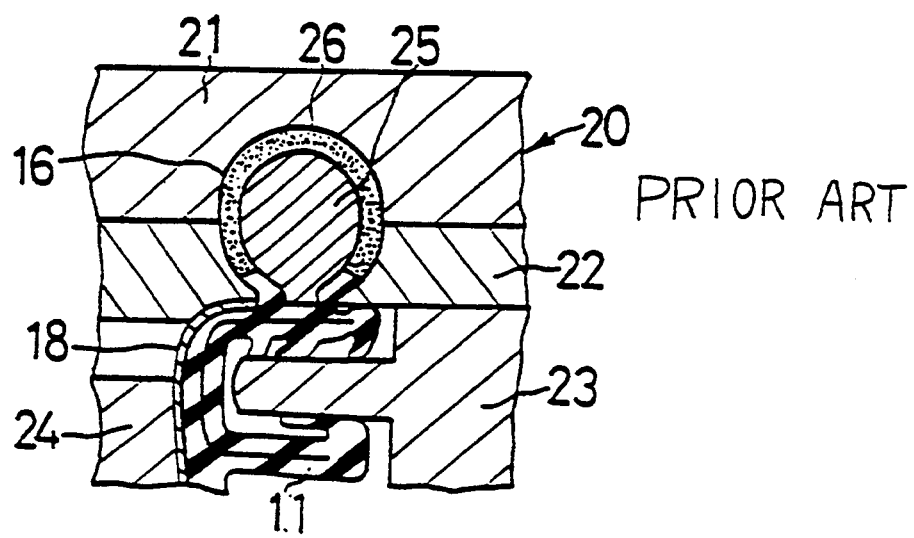
FIG. 8 is a cross-sectional view of the weather strip taken along the line VIII—VIII of FIG. 7, of which the sealing portion is formed by molding.

FIGS. 5 and 6 illustrate a third embodiment of a method in accordance with the present invention.

A weather strip 50 of the third embodiment has a similar construction to that of the weather strip 30 of the first embodiment except that the hollow sealing portion 33 including its root portion is made of sponge rubber and that the weather strip 50 has a lip 39 which projects from one of the side walls of the trim portion 31 towards the bottom thereof.

Figure 5A:
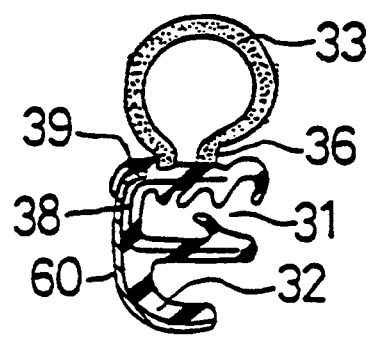
FIG. 5A is a cross-sectional view taken along line 5A—5A of FIG. 5.

In FIGS. 5, 5A and 6, parts corresponding to those in FIGS. 1, 2 are given the same reference numerals as in FIGS. 1, 2.

The weather strip 50 is produced by the following method. After the covering layer 60 is bonded to the trim portion 31, the sealing portion 33 is cut away from one longitudinal part of the weather strip 50. Then, the one longitudinal part of the weather strip 50 is bent and placed within the mold 70, as shown in FIG. 6 so that the lip 39 is interposed between the heated middle mold member 72 and one widthwise end edge of the covering layer 60 in pressing contact therewith. Next, a sponge rubber material is injected into the cavity 76 of the mold 70 to form the molded sealing portion 34.

With the present embodiment, the lip 39 projecting from the trim portion 31 achieves an operational effect like the lip 37 of the first embodiment.

As described above, in accordance with the present invention, by virtue of the projecting portion such as a lip, the finishing covering layer such as a fabric layer can be prevented from being thermally affected by the heated mold member in the molding step of the sealing portion of the weather strip. Accordingly, the above-described finishing covering layer can be bonded to the weather strip continuously in the process of extruding the weather strip. As a result, with the present invention, the work efficiency is greatly improved. Furthermore, the improved work efficiency is not reduced by the provision of the projecting portion because it is formed with the extrusion of the weather strip.

Furthermore, the projecting portion covers only the widthwise end edge of the finishing covering layer so as not to spoil the appearance of the weather strip.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method for producing a weather strip having a corner part to be attached to a corner of a door opening of a motor vehicle, the weather strip having a trim portion and a sealing portion which extends outwardly from said trim portion, an external surface of said trim portion being covered with a finishing covering layer, said sealing portion of said corner part of the weather strip being formed by molding, the method comprising the steps of:

extruding a weather strip having said trim portion and said sealing portion;

covering an external surface of each trim portion of the extruded weather strip with said finishing covering layer continuously in a process of said finishing extruding step so that one widthwise end edge of said finishing covering layer extends along a border between said external surface of said trim portion and said sealing portion;

cutting at least part of said sealing portion away from one longitudinal part of said extruded weather strip covered with said finishing covering layer;

bending said trim portion of said one longitudinal part of said extruded weather strip into such a configuration as to conform to the corner of said door opening of the motor vehicle;

placing said bent one longitudinal part of said extruded weather strip within a mold including mold members which define a cavity for forming a molded sealing portion so as to interpose a projecting portion formed along said border between said mold members and said one widthwise end edge of said finishing cover layer and pressing said projecting portion against said one widthwise end edge of said finishing covering layer thereby preventing heat of said mold members from being transmitted to said finishing covering layer, and preventing said finishing covering layer from deteriorating; and injecting a molding material consisting of one of rubber and synthetic resin into said cavity to form said molded sealing portion onto said bent one longitudinal part of said extruded weather strip.

2. The method according to claim 1, wherein said projecting portion is a lip which serially projects from a root portion of said cut away sealing portion along said border, and said lip is formed by extrusion with said weather strip.

3. The method according to claim 1, wherein said projecting portion is a lip which serially projects from said trim portion along said border, and said lip is formed by extrusion with said weather strip.

4. The method according to claim 1, wherein said projecting portion is formed by bending a root portion of said cut away sealing portion along said border so as to cover said one widthwise end edge of said covering layer when said one longitudinal part of the said weather strip is placed within said mold.

5. The method according to claim 1, wherein said weather strip is attached to an edge around a door opening of a motor vehicle, said trim portion has a U-shaped cross-section, and said sealing portion projects from a side wall of said trim portion.

* * * * *